United States Patent

Greenwood, Jr. et al.

[11] Patent Number: 5,949,638
[45] Date of Patent: Sep. 7, 1999

[54] MULTIPLE ANODE CAPACITOR

[75] Inventors: John M. Greenwood, Jr.; Van Ness Harwood, Jr., both of Williamsville; Oakland J. Weatherup, Lockport, all of N.Y.

[73] Assignee: CM Components, Inc., Williamsville, N.Y.

[21] Appl. No.: 09/250,137

[22] Filed: Feb. 16, 1999

Related U.S. Application Data

[63] Continuation-in-part of application No. 09/040,903, Mar. 18, 1998
[60] Provisional application No. 60/041,492, May 2, 1997.
[51] Int. Cl.$^6$ .............. H01G 9/04; H01G 9/02; H01G 4/32
[52] U.S. Cl. .............. 361/508; 361/511; 361/512; 361/516; 361/528; 361/530; 361/532
[58] Field of Search ............... 361/500, 502, 361/508–509, 511–512, 516–517, 520, 524, 528, 530–533, 535–538; 29/25.03

[56] References Cited

U.S. PATENT DOCUMENTS 5,146,391  9/1992  MacFarlane et al. ............ 361/525
5,153,820  10/1992  MacFarlane et al. ............ 361/525

*Primary Examiner*—Dean A. Reichard
*Assistant Examiner*—Anthony Dinkins
*Attorney, Agent, or Firm*—Crossetta & Associates

[57] ABSTRACT

A capacitor of hybrid construction is disclosed including single cathode and multiple anode combination utilizing a variety of anode foils selected for their ability to achieve optimal performance in selected areas of the construction of a spiral would capacitor and blended in a fashion to create maximum energy density and minimum open space.

24 Claims, 3 Drawing Sheets

MULTIPLE ANODE CAPACITOR

This Application claims the benefit of U.S. Provisional Application Ser. No. 60/041,492 filed May 2, 1997.

TECHNICAL FIELD

The present invention relates to capacitors, more particularly to electrolytic capacitors, and still more particularly to wound, multiple anode, high energy density electrolytic capacitors. This is a CIP of co-pending application Ser. No. 09/040,903 filed Mar. 18, 1998.

BACKGROUND OF THE INVENTION

A capacitor is a device used in electronic circuits to store electrical charge. Electrical charge Q. is measured in coulombs and one electron has a charge of about $1.6 \times 10^{-19}$ coulombs. Typically, the electrical charge is stored on the surfaces of separated plates (electrodes) immersed in an electrolyte. The plates are generally layered and may be planar or wound, e.g. rolled, as for example in a spiral roll. A dielectric layer of mechanical separator material, such as dielectric paper and the like, is arranged to maintain the plates separated from physical contact. The charge creates an electrostatic field which exists between the plates and therefore creates a potential difference, or voltage V, between the plates.

Capacitance C, is measured in farads which is defined as one coulomb per volt. In general, the capacitance of a device is determined by dividing the charge stored on the plates by the voltage the charge creates across the plates. By increasing the capacitance, a greater charge can be stored per unit volt.

Generally, capacitance can be increased in two ways; by increasing the area of the plates and by reducing the separation distance between the plates, such as by using very thin dielectric separators. In an electrolytic capacitor, capacitance is achieved on the anode (+) plate by electrolytically forming a thin layer of dielectric oxide on the surface and immersing it in an electrolyte solution which functions as the negative (−) plate.

The energy, in joules, stored in a capacitor equals $\frac{1}{2}CV^2$ wherein V is voltage. In some applications, it is desired to maximize the energy density of a capacitor package. One such application is in the biomedical arts, and especially in implantable devices such as medical defibrillators.

Defibrillators must be capable of supplying an intense burst of energy to the heart in a very short time. The battery power supply of a typical implantable defibrillator is incapable of producing this energy alone. Therefore, the battery is used to charge an electrolytic capacitor which is then used to deliver the energy to the heart. For obvious reasons, it is important to minimize the size of the capacitor which is usually the largest component in the defibrillator circuit. It is thus advantageous to use a capacitor having as high an energy density as possible. Wound configurations are generally highly reliable and more convenient to produce, but are subject to packaging inefficiencies.

One packaging inefficiency associated with wound capacitors is the presence of open space inherent in the use of winding mandrels. Wound capacitors utilize winding mandrels to tightly wrap the electrodes in a spiral, but upon withdrawal of the mandrel an open space is left in the center of the capacitor. The smaller the diameter of the mandrel the more anode material can be packaged in a defined cylindrical housing and the smaller the open space left from mandrel withdrawal.

Anode foil is generally available in two generic forms, a solid-core anode form wherein the core is considered effectively non-porous in nature and the surface is etched and generally comprises an oxide to maintain high voltage storage; and, a porous anode form which is generally deeply etched or otherwise treated to form pores through the foil, and which also generally comprises an oxide surface to maintain high voltage storage. Anode foils are generally brittle and tend to break when acutely bent, particularly when the bend is accompanied by tensile stress. Cathode foils are generally very thin flexible foils which bend easily without breaking.

Though small mandrel diameters are desirable for minimizing open spaces, practically speaking the minimum diameter of a commercially useful mandrel is limited by the brittleness of the anode foil. Breaking of an anode foil during assembly can cause both a disruption in the assembly process and a disruption in anode continuity, which can result in both lost manufacturing time and lost capacitor efficiency.

What is needed then, is a method of producing wound capacitors which permits reduction of mandrel diameter to decrease central open space and increase the overall capacitance efficiency of a cylindrical packaging housing.

One object of the invention is to provide a method for assembling a multiple anode capacitor which provides decreased open space within a cylindrical packaging container.

Another object of the invention is to provide a method for assembling a multiple anode capacitor which provides increased energy density within a defined container.

Still another object of the invention is to provide an extremely high energy density capacitor assembly especially suited for use in implantable medical devices such as defibrillators.

These and other objects of the invention will become apparent from the following recitation of the invention.

SUMMARY OF THE INVENTION

The present invention includes a multiple anode capacitor arrangement comprising a combination of porous and solid core anode foils, arranged to maximize capacitance which can be achieved in a defined volume, wound capacitor. More specifically, the invention comprises a multiple anode, aluminum electrolytic wound capacitor assembly comprising a cylindrical casing having closed ends and positive and negative terminal means. Disposed within the casing is a spiral wound capacitor body having a layered combination of porous and solid core anode aluminum foil layers, a cathode aluminum foil layer and one or more mechanical separator layers disposed between the cathode and the anode layers. By layers is meant that the foils and dielectric mechanical separators are arranged in the form of stacked plates, sheets, strips and the like. In a preferred embodiment a header is crimped or otherwise attached to an end of the casing, the header including a primary anode terminal means and/or a primary cathode terminal means.

In the method of the invention, a wound capacitor is formed by gripping a thin flexible foil cathode layer with a mandrel to start the winding process, sandwiching the cathode foil layer between mechanical separator layers, spiral winding the multilayered laminate, interleaving a solid core anode foil first layer between adjacent mechanical separator layers of the spiral winding which frictionally engage the anode foil layer and hold same in place, and progressively thereafter interleaving one or more porous anode foil layers between the solid core anode foil first layer and adjacent mechanical separator layers, with the mechanical dielectric separators arranged to maintain the cathode foil winding from physically contacting the anode foil windings.

It has been found, that such combination of windings of the method, enables the use of an extremely small diameter winding mandrel and can significantly reduce the open space occasioned when the mandrel is withdrawn at completion of the winding. Indeed it has been found that using this method of assembly, the primary limitation to down-sizing of the mandrel diameter is that it comprise sufficient strength to enable gripping the end of a flexible core cathode foil, with and/or without a dielectric separator layer, and support the accumulation of windings to the desired circumference of the capacitor.

The applicants have found that during spiral wrapping, commercially available thin flexible cathode foil and thin separator layers can generally be bent to extreme acute angles without breaking and that the incidence of breakage of these components is not a significant impediment to the use of small diameter mandrels. Indeed, the limitation to mandrel size which is appears to be imposed by these components is that the mandrel have sufficient mass to grip the winding and support it through the winding process. Thus, for example, for capacitors sized to be used in implantable defibrillators, a mandrel diameter of about 1.0 mm or less might be suitably used with such components.

Though porous anode foils are generally considered necessary components for obtaining the highest possible capacitor efficiency in a wound capacitor, commercially available porous anode foil is so brittle that there is a high incident of breakage of anode foils when they are bent to acute angles under tensile wrapping stress in situations wherein the circumferential wrap diameter is less than about 5.0 mm. Breakage of a porous anode during assembly disrupts the efficiency of the manufacturing process by creating a failure in the winding process, and also disrupts the continuity of the foil, decreasing the overall effective storage capacity that can be conveniently discharged through typical positioned terminal ends of a wound capacitor. Thus, the economics of manufacturing and the requirements of capacitance consistency appear to counteract any advantage which might be gained by reducing center space through down-sizing the mandrel diameter from about 5.0 mm in a wound capacitor comprising a porous anode.

Applicants have found however, that having one or more anode foils in engaged opposing layered arrangement, significantly reduces the probability of a break occurring at the same position in any two opposing layers, and that a disruption in the continuity in one opposing anode layer is generally bridged by the other opposing anode layer such that there is no significant loss in discharge surface area of the overall layered anode.

Further, applicants have found that solid-core anode foils have a significantly reduced tendency to break than porous anode foils and can be generally conveniently interleaved in a winding, without manufacturing process disrupting breakage, on a mandrel at circumferential winding diameters much less than about 5.0 mm. Indeed, applicants have interleaved solid core anode foils at circumferential winding diameters of 2.0 mm and even less without assembly disrupting breakage in capacitors sized for implantable defibrillators. Even if breakage occurs, it is generally limited to occurring at the extreme initial interleaved end of the anode after gripping of the anode between the separator layers is secure and therefore does not pose an assembly disrupting problem. Thus, if breakage of the solid core anode does occur, it generally only results in an inconsequential loss of capacitance corresponding to the insignificant quantity of continuity disrupted surface at the initial end of the wound solid core anode.

A single solid core anode foil, standing alone, is not generally considered a very high efficiency anode. To increase anode efficiency applicants have found it is preferred to use a porous anode and particularly to use a layered arrangement of porous anodes which enable access to inner anode surfaces for an acceptable internal resistance. Porous anodes are very brittle and tend to break in smaller sized capacitors used for implantable defibrillators, but if a solid core anode can be interleaved at a significant earlier point in a winding than is practical for interleaving a porous anode using current winding techniques, the additional length of interleaved solid core anode foil provides an increased total capacitance over the total capacitance which can be otherwise achieved using a porous anode.

Interestingly, applicants have found that brittle porous anode foil can be interleaved in a winding, without assembly process failure, at smaller turn diameters when interleaved between a separator layer and a solid core anode than when interleaved alone between two separator layers. It is speculated that even when a break occurs in the porous anode foil during winding, the irregular oxide comprising surface of the solid core anode engaging along the irregular oxide comprising surface of a porous anode foil provides sufficient grip to prevent assembly process failure. Thus, even though a continuity break of the brittle porous anode foil may occur, the assembly process is not disrupted and the broken porous anode foil remains in engaging relationship with a continuous surface of solid core anode foil.

The result is that interleaving a solid core anode foil layer first, provides a continuity base for attaining earlier interleaving of brittle porous anode foil than would be possible alone, and the final wound capacitor has more electrically continuous anode foil in opposed relationship to the cathode foil than can be otherwise achieved. Sandwiching the solid core anode foil with porous anode foil then provides a maximum capacitance continuous layered anode surface adjacent a cathode foil, which minimizes unused spacing in the winding and can be conveniently discharged at a remote end.

Thus, if the first anode interleaved is a solid core anode foil, with progressive interleaving of additional porous anode foils, mandrels of 2 millimeter diameter can be successfully employed. Such reduction in mandrel size enables an additional about six turns of interleaved anode to be employed opposite a cathode foil, in what otherwise would be open space, providing an approximate 8% gain in total available capacitance for a 12.7 mm diameter capacitor unit generally used in defibrillator devices.

In a preferred embodiment, the solid core cathode layer with dielectric separator layers sandwiched thereover is initially wound through at least about one circumvention of the mandrel, followed by the interleaving of a solid core anode foil for the next about two circumventions of the mandrel, with one or more porous anode foils being thereafter progressively interleaved into the winding, juxtapositioned on either or both sides of the solid core anode foil, to form the desired winding arrangement.

In a particularly preferred arrangement of the invention, leads, commonly referred to as terminal strips, are attached to each of the anodes and the cathode foil, the leads comprising an attaching section which attaches to the foil and a projecting tab. Each of the attaching sections are arranged to be offset from the other attaching sections when the foils are wound together. The projecting tabs comprise the leads of the anode foils and are generally connected to a primary anode terminal. A lead of the cathode foil is generally connected to a primary cathode terminal. A suitable electrolyte permeates the wound capacitor body. The first anode foil has a first anode terminal strip affixed transversely to the first anode foil, the second anode foil has a second anode terminal strip affixed transversely to the second anode foil and is offset with respect to the first anode terminal strip. The third anode foil has a third anode terminal strip affixed transversely to the third anode foil, the third anode terminal strip being offset with respect to both the first anode terminal strip and the second anode terminal strip. The attachment of terminal strips and configuration of leads again acting to reduce the presence of open spaces.

In a preferred embodiment, the dielectric separator layers are formed from a kraft capacitor dielectric tissue paper. In another preferred embodiment, each separator layer comprises two or more layers of kraft capacitor tissue paper.

The above features and advantages of the invention will become more apparent to those having skill in the art from the following written description, drawings and appended claims.

DETAILED DESCRIPTION OF THE DRAWINGS

Figure 1:
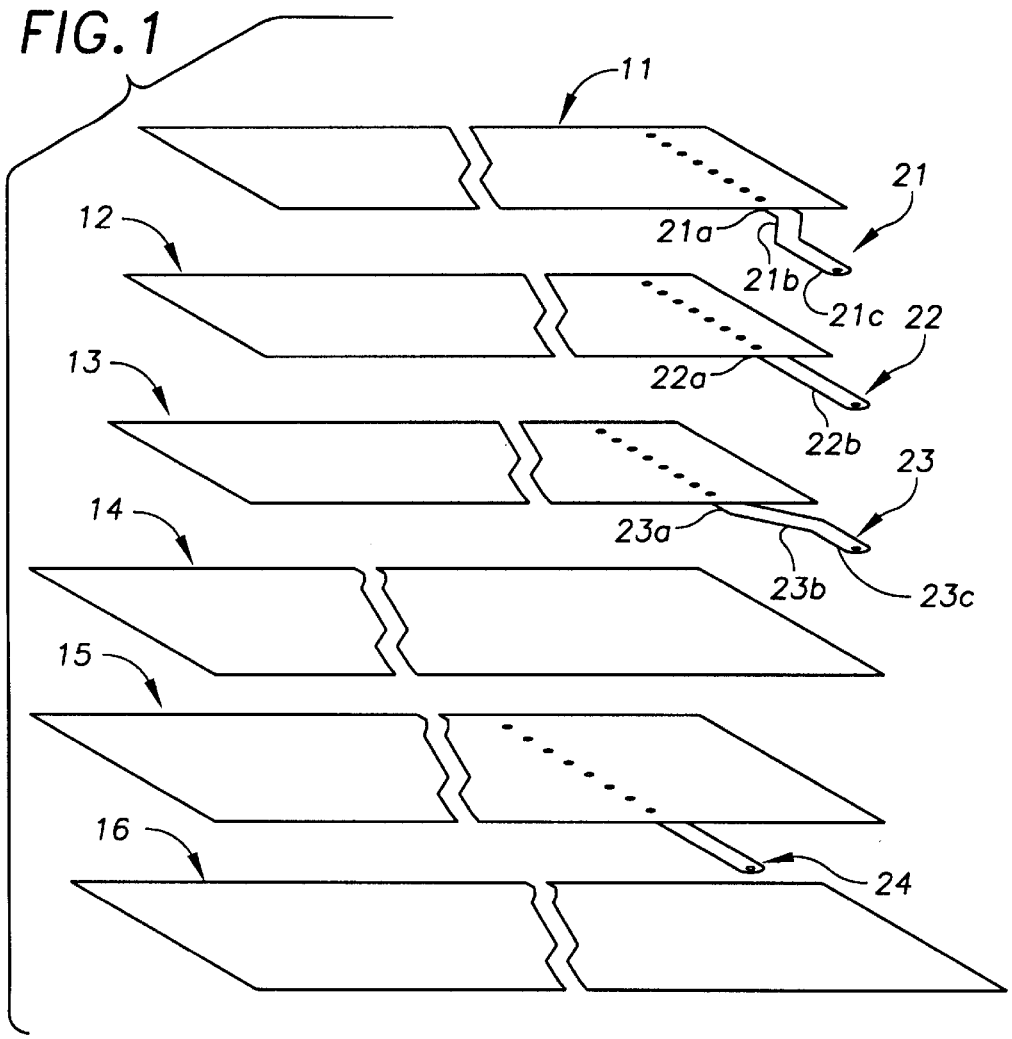
FIG. 1 is an exploded perspective view of an embodiment of the invention illustrating relative positioning of initial and final ends of anode, cathode and separator layers in an arrangement wherein the cathode and sandwiching separator layers are to be gripped by a mandrel.

At the outset, it should be clearly understood that like reference numerals are intended to identify the same structural elements, portions or surfaces consistently throughout the several drawing figures as such elements, portions or surfaces may be further described or explained by the entire written specification, of which this detailed description is an integral part. Unless otherwise indicated, the drawings are intended to be read together with the specification, and are to be considered a portion of the entire written description of this invention.

It should also be appreciated that, although a three anode capacitor is illustrated in the drawings, the invention is directed to a multiple anode capacitor, and the appended claims are not intended to be limited in scope to any specific number of anodes or leads therefrom. Rather, the claims are directed to a capacitor having two or more anode layers.

Figure 5:
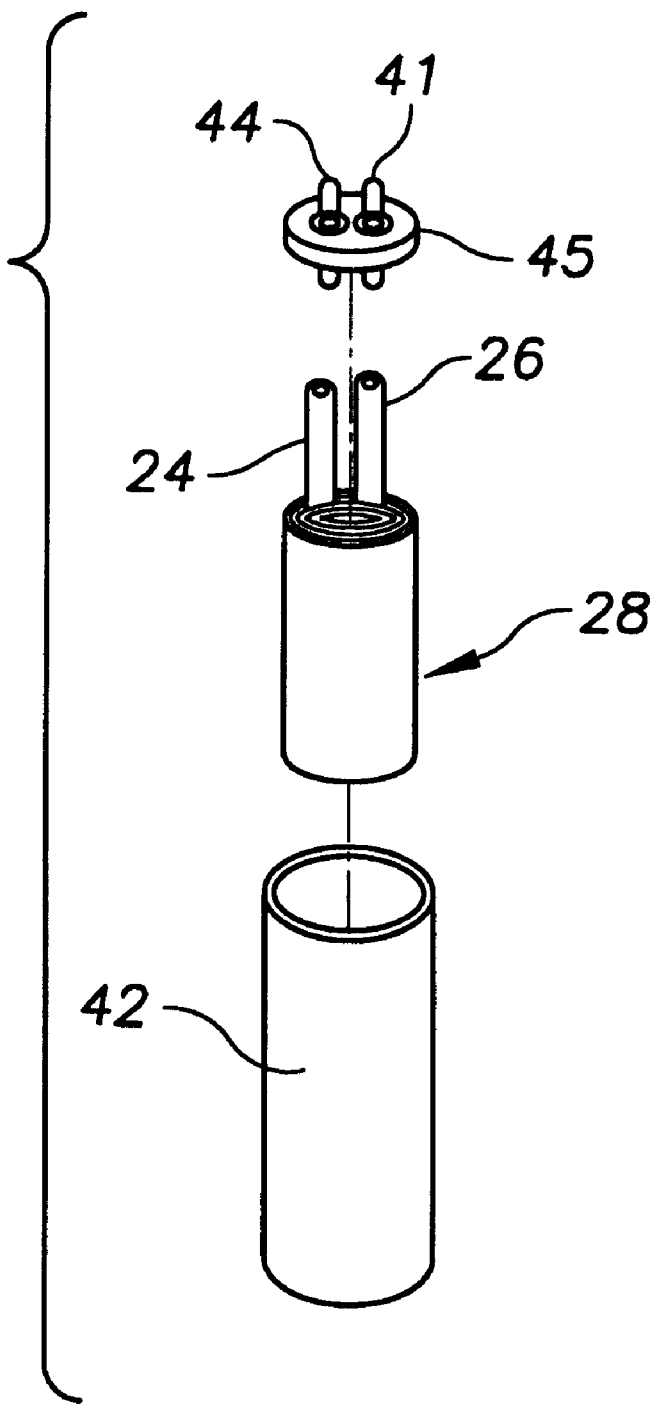
FIG. 5 is a perspective view of a completed capacitor in accord with the invention.

The individual components and assembly of the capacitor are best understood with reference to FIG. 5. Therein, a preferred embodiment of the capacitor of the invention is illustrated in exploded perspective as comprising a generally cylindrical casing or housing 42 having a generally non-conductive header 45 with a primary anode terminal illustrated as stud 41, a primary cathode terminal illustrated as stud 44 and wound capacitor body 28 having cathode tab 24 and combined anode tabs 26. In a preferred embodiment the housing is a cylinder having a closed bottom and open top. Generally the housing is made of aluminum, preferably thin walled aluminum having a thickness from about 0.006 to about 0.012 inches and most preferably about 0.010 inches in thickness.

The wound body 28 is formed first and generally impregnated thereafter with electrolyte, before or after being inserted into the housing in a close fit. It should be understood, the housing may be made of other materials and take on other shapes. Connecting tabs 24 and 26 are connected to terminals or studs 44 and 41 by any appropriate means, such as by welding, riveting and the like. Terminals 44 and 41 are rigidly secured to header or terminal plate 45. The final assembly and manufacturing step is to crimp or otherwise secure the header into place.

Figure 3:
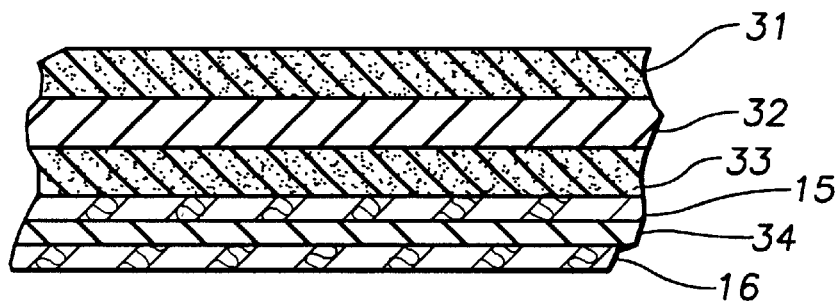
FIG. 3 is a fragmentary cross-sectional view of the capacitor shown in FIG. 2, taken generally along about line 3—3.
Figure 4:
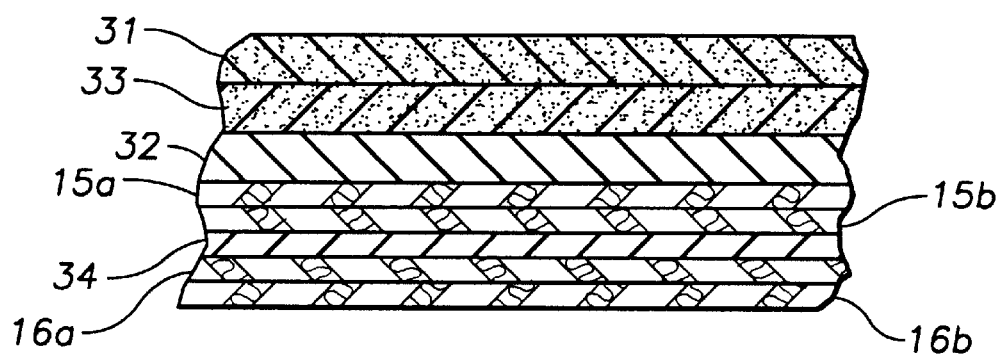
FIG. 4 is a view similar to that of FIG. 3, but of a further embodiment with a double paper layer substituted for the single paper layer, and with the center anode foil being of a non-porous construction.

The anodes, cathode and separator layers of the capacitor are shown in exploded perspective view in FIG. 1, and in cross-sectional view in FIGS. 3 and 4. Anode layers are illustrated as comprised of roughened aluminum foil, being of solid-core, generally non-porous construction, or of roughened, porous aluminum foil construction. By porous construction is meant the aluminum foil has openings therethrough, generally formed by deep etching, which preferably provide a minimum porosity, measured by air flow, of at least about 0.5 cc/sec-cm$^2$-atm and greater as distinguished from solid-core construction wherein the foil has not been deeply etched or the like to form openings therethrough. By roughened is meant that the surface of the foil is grooved, valleyed, creased, scratched, dimpled, pitted, tunneled, etched, sputter modified and the like to increase the surface area of the foil surface. The first interleaved anode foil or layer 12 is illustrated as comprising a strip of roughened solid core aluminum foil 32. The second interleaved anode foil or layer 13 as comprising a strip of roughened porous aluminum foil 33, and the third interleaved anode foil or layer 11 as comprising a strip of roughened porous aluminum foil 31. While the length and width of the anode layers are determined by the total capacitance and desired length to diameter ratio of the finished capacitor, a length of approximately 10 inches is typical in the high energy density capacitors used in implantable medical devices such as defibrillators.

The aluminum foil used in the anodes can be of any suitable thickness, but is generally from about 0.002 to about 0.004 mil in thickness and has a preferred forming voltage of about 420 volts for use in defibrillators. It should be understood however, that selection of forming voltage is generally dictated by the ultimate capacitor voltage requirement. The aluminum foil used is typically of a very high purity, generally 99% or higher, and is usually manufactured especially for electrolytic capacitor use, generally with an oxide surface. The capacitance of the aluminum foil is also dependent upon the surface area of the foil and generally the surface area is further increased by roughening, particularly by etching and the like. Porous aluminum foil has generally been deeply etched and can be mechanically penetrated for porosity. The surface of the foil is generally roughened to enable a capacitance of at least about 0.2 $\mu$F per square centimeter, preferably at least about 0.4 $\mu$F per square centimeter, and most preferred about 0.9 $\mu$F per square centimeter for a 420 volt foil. In commercial use, capacitance is generally selected in accord with the voltage rating of the capacitor. Manufacturers of capacitor aluminum foil include Becromal, JCC, Satma, KDK and ACOM (Matsushita).

The cathode foil or layer is generally longer in length than the anode layers, generally by about one winding turn at the center of the winding enough ending length to overlap the end of the longest anode strip on the roll. The cathode layer is typically aluminum foil, but may be any suitable conductor having a thickness of about 0.0005 to about 0.002 mil and may have an oxide coating. Capacitance of the cathode aluminum foil is generally from about 5 to about 300 $\mu$F per square centimeter, but can be greater. An aluminum purity of the cathode of about 98% or more is generally preferred. Both Becromal and Satma produce suitable foil for the cathode layer.

Figure 2:
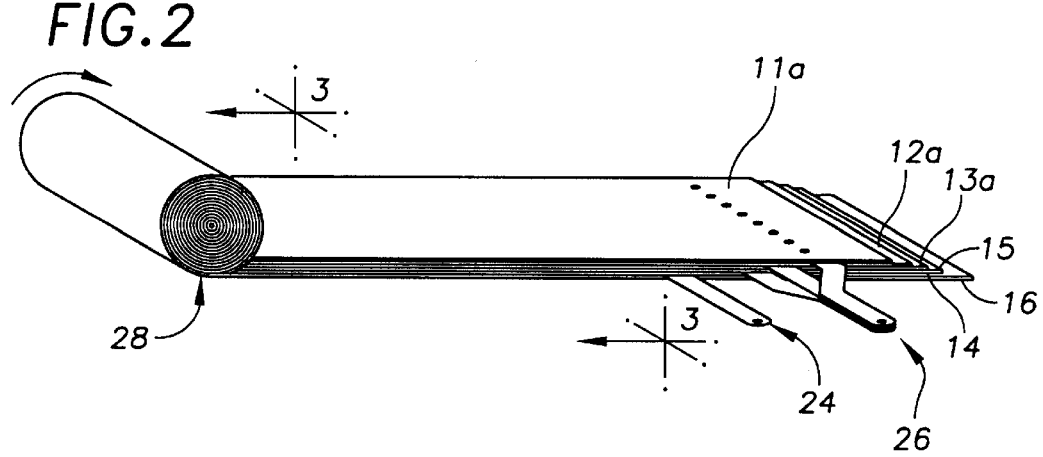
FIG. 2 is a perspective view of the capacitor as the layers, shown in FIG. 1, are being rolled.

In FIGS. 1 and 2, each anode and cathode layer is illustrated as having a lead or terminal strip attached thereto, with each terminal strip including an attaching section which is attached to the foil strip, and a connecting tab which may be secured to a stud or terminal 41 or 44.

In accordance with FIGS. 1–4 three anode layers 11, 12 and 13 are illustrated comprising foil strips 31, 32 and 33 respectively as used in a three anode capacitor configuration. Foil strips 31, 32 and 33 are shown as comprising anode terminal strips 21, 22 and 23 respectively, each strip having attaching sections 21a, 22a and 23a respectively. The attachment strips are illustrated as spaced along their respective foil strips, so as to be offset with respect to each other upon being wound to form the capacitor. Such offset of terminal strips enables the avoidance of stacking of terminal strips in the wound capacitor, and has the effect of minimizing air space between winding layers and maximizing capacitance per unit volume of the assembled capacitor.

FIG. 1, illustrates anode layer 11 having terminal strip 21 comprising an attaching section 21a, which is attached transversely to aluminum foil anode 11, and a connecting tab which is illustrated as comprising leftward angling intermediate section 21b and a remote section 21c. Terminal strip 22 of anode layer 12 is shown as having a connecting tab comprising intermediate section 22b projecting straight from its attaching section; while terminal strip 23 of anode layer 13 is shown as having an intermediate section 23b projecting rightwardly at an angle from its attaching section. Remote sections 21c and 23c are each illustrated as extending upwardly in an axis about parallel to the axis of their respective attaching sections. In a preferred embodiment, intermediate sections 21b and 23b are angled at about 45° from their attaching sections and remote sections. The attaching section of the terminal strip is generally attached to the aluminum foil by cold welding, but any convenient attachment means such as piercing, flattening, stitching, welding or the like may be used.

In spiral rolled windings containing a plurality of stacked layers of material, starting or ending a plurality of layered material in common alignment leaves a ridge or bump in the roll which constitutes an undesired open space and reduces the efficiency of the energy density of the capacitor volume.

In a preferred embodiment of the rolled capacitor of the present invention, it is been found that in addition to initiating the cathode layer wrap at the mandrel and interleaving the solid core anode first, staggering the starting and ending edges of the subsequent anode layers reduces open spaces and improves the energy density of the capacitor. Staggering the starting edges of the roll and the ending edges of the roll creates a significant increase in energy density, minimizes the height of bumps in the roll which can cause cracking, and involves no significant manufacturing difficulties. In a most preferred embodiment of the invention, the ending edges of the anodes are staggered so that their ends are spaced around the circumference of the capacitor, with the cathode of sufficient length to overlap all the anodes.

FIGS. 1 and 2 illustrate the staggering of anode and cathode foil ends and separator arrangements at the start and end of the winding in an embodiment of a three anode foil arrangement of the invention. At the start of the winding in the illustrated arrangement of FIG. 1, the end of cathode layer 14 and ends of separator layers 15 and 16 sandwiched thereover, are gripped by the mandrel to form an initial cathode layer winding through about one circumvention of the mandrel. The initial end of solid core anode layer 12 is thereafter interleaved between the wound separator layers through about two or more windings around the mandrel and porous anode layers 13 and/or 11 are progressively interleaved within about the next winding about the mandrel. At the end of the winding, FIG. 1 illustrates anode layer 12 ends first, anode layer 13 second and anode layer 11 last, all within about a final turn at about the circumference of the capacitor body. In FIG. 2, anode layer 11a is illustrated as ending first, anode layer 12a second and anode layer 13a last, generally all within about a final turn at about the circumference of the capacitor body. In both figures, separator layers 15 and 16 continue to wrap at least a full turn around the last ending anode layer, together with cathode layer 14.

In the illustrated arrangements, the terminal strips are shown as being in preferred generally equal width, and arranged to be rolled to a close side-by-side proximity in the assembled capacitor. It should be understood however, that the terminal strips are not required to be of equal width nor is it required that they be arranged for close side-by-side proximity.

Upon winding the three anodes into position in the capacitor, the attaching sections are positioned circumferentially offset to each other, avoiding stacking of the attachment sections, while the projecting tabs form a radially stacked confluence for efficient formation of an anode terminal end for the capacitor. The advantage of this unique design is that it enables more anode material to be placed in the capacitor, thereby increasing the capacitance per unit volume. FIGS. 1 and 2 also illustrate the relative position of the terminal strips of the cathode and anodes. Cathode terminal strip 24 is illustrated as offset from the anode terminal strips when the multiple layers are rolled, the cathode attaching section does not overlap an anode attaching section and all attaching sections are physically spaced along about the circumference of the winding.

It should be apparent from the foregoing that one or more separator material layers may be placed on each side of the cathode layer to physically separate it from the anode layers. The anode layers are not separated from one another by paper. In a preferred embodiment, the separator material is a dielectric capacitor tissue paper, Type UC, having a bone dry thickness of from about 0.0002 to about 0.0005 inches, preferably as manufactured by MH Dielectrics, Inc. of Holly Springs, Pa.

FIGS. 3 and 4 illustrate that paper separator layers 15 and 16 are placed adjacent cathode layer 14 to prevent contact between the cathode and the anode layers. In a preferred embodiment shown in FIG. 4, two layers of kraft dielectric capacitor tissue paper are used. When a single layer of tissue paper is used, a fault anywhere in the paper may allow a short-circuit between an anode and the cathode in the capacitor. In a two layer embodiment, it is extremely unlikely that a fault would occur at exactly the same location in both paper layers. A single layer of paper could be used with an attendant higher risk of failure due to a fault in the insulating paper. FIG. 1 clearly illustrates that the cathode layer and the paper layers are all longer than the anode layers.

Once the layers are in position, they are wound about a mandrel into a roll as shown in FIG. 2. The mandrel is of a small diameter, but of a diameter great enough to prevent the foils from being damaged during winding.

Single and double paper layer arrangements are illustrated in fragmentary cross-sectional view in FIGS. 3 and 4, respectively. FIG. 3 is taken generally along about plane 3—3 of FIG. 2, while FIG. 4 is a view similar to that of FIG. 3, but with a double paper layer substituted for the single paper layer. FIG. 3 clearly shows anode foil 31 adjacent anode foil 32, which in turn, is adjacent anode foil 33, which in turn, is adjacent paper separation layer 15, which in turn, is adjacent cathode foil 34, which in turn, is adjacent paper separation layer 16. When wound, paper layer 16 would contact and be adjacent to anode foil 31, separating the cathode from the anode. In FIG. 4, single paper separation layers are replaced by double paper layers 15a,15b and 16a,16b and both porous anode foils 31,33 are arranged on one side anode foil 32.

The fully wound capacitor layers are shown in FIG. 5, which illustrates how the individual anode projecting tabs emerge in combined alignment as anode tab 26 and separated from the cathode attaching section 24. Once the capacitor layers are wound, the wound capacitor body 28 can be impregnated with a suitable electrolyte by immersing the wound body into a bath thereof. Various electrolytes are suitable and well known in the art. For example, an ethylene glycol base with dicarboxylic acid concentration of between about 3 and about 20%, adjusted to a pH of approximately 7.0 and resistivity of about 300–1000 ohms-cm., depending upon the ultimate voltage requirement, being appropriate.

Impregnation with the electrolyte, can occur before or after the wound capacitor body 28 is placed in housing 42 as shown in FIG. 5. Terminals 44 and 41 are previously rigidly secured to header or terminal plate 45. Tabs 24 and 26 are connected to terminals or studs 44 and 41, generally by riveting, and the open end of the housing is crimped to secure the header in place.

While the best known modes of this invention have been shown herein, applicant does not intend to be limited to the particular details described and illustrated and it is understood the embodiments and details can be altered by one skilled in the art.

What is claimed is:

1. A multiple anode high energy density electrolytic capacitor comprising a cylindrical housing containing a body having a layered spiral winding said body having an elongate spiral wound cathode layer sandwiched between elongate spiral wound first and second separator layers, an elongate spiral wound solid core anode layer interleaved in the spiral winding and separated from contacting said cathode layer by being arranged between said first and second separator layers, an elongate spiral wound first porous anode layer interleaved in the spiral winding between said solid core anode layer and a separator layer, wherein said cathode layer, is spiral wound for at least about one turn around the central axis of the spiral winding before interleaving of said solid core anode layer begins, and said solid core anode layer is spiral wound for at least one turn around said central axis of said spiral winding before interleaving of said first porous anode layer begins.

2. The multiple anode capacitor of claim 1 comprising a second spiral wound porous anode layer, interleaved into said spiral winding between said solid core anode layer and one of said first and second separator layers, beginning after interleaving of said first porous anode layer begins.

3. The multiple anode capacitor of claim 2 wherein said first and second porous anode layers are interleaved on the same side of said solid core anode layer.

4. The multiple anode capacitor of claim 1 wherein at least one of said first and second separator layers comprises two layers of separator material.

5. The multiple anode capacitor of claim 1 comprising two layers of separator material arranged on each side of said solid core cathode layer.

6. The multiple anode capacitor of claim 1 wherein at least one of said first and second separator layers comprises comprises a dielectric tissue paper.

7. The multiple anode capacitor of claim 1 wherein the cathode and anode layers comprise an aluminum foil.

8. The multiple anode capacitor of claim 7 wherein a porous aluminum foil comprising said porous anode layer has a minimum porosity, measured by air flow, of about 0.5 cc/sec-cm$^2$O-atm.

9. The multiple anode capacitor of claim 8 wherein said porous anode layer has a foil surface area, measured by capacitance, of at least about 0.2 $\mu$F per square centimeter.

10. The multiple anode capacitor of claim 7 wherein a surface of a porous aluminum foil anode layer is roughened to enable a capacitance of at least about 0.4 $\mu$F per square centimeter for 420 volt foil.

11. The multiple anode capacitor of claim 1 wherein said separator layers, said cathode layer, and said anode layers, are in contact with an electrolyte.

12. A multiple anode high energy density electrolytic capacitor comprising: a cylindrical housing containing a body having a layered spiral winding having an elongate spiral wound cathode layer, and a plurality of elongate spiral wound separator layers and anode layers; said cathode layer comprising an elongate strip of aluminum foil, said separator layers comprising elongate strips of dielectric material arranged to sandwich said elongate cathode layer, and said anode layers comprising a first anode layer having a first end formed of a strip of solid core aluminum foil and a second anode layer formed of a strip of porous aluminum foil; wherein said cathode layer sandwiched between said separator layers, is wound for about one turn about a central axis of the spiral winding before interleaving said first anode layer; said first anode layer is interleaved into said spiral winding, between a first separator layer and a second separator layer of said spiral winding, beginning with said first end of said first anode foil being interleaved after completion of about one turn of said spiral winding of said cathode; and said second anode foil layer is interleaved into said spiral winding, between said first anode layer and said first separator layer, after completion of at least about two turns of said spiral winding of said cathode layer about the central axis.

13. The multiple anode capacitor of claim 12 wherein a third anode layer, formed of a porous aluminum foil, is interleaved into said spiral winding between said first anode layer and at least one of said first and second separator layers, beginning after completion of at least about two turns of said spiral winding of said cathode about the central axis.

14. The multiple anode capacitor of claim 12 wherein two layers of dielectric material are arranged to form at least one of said first and second separator layers.

15. The multiple anode capacitor of claim 12 wherein at least one of said first and second separator layers, comprises a dielectric tissue paper.

16. The multiple anode capacitor of claim 12 wherein said cathode layer comprises a terminal strip affixed transversely to said cathode foil and arranged to engage a primary cathode terminal of said capacitor.

17. The multiple anode capacitor of claim 12 wherein said first anode layer comprises a terminal strip affixed transversely to said first anode foil strip, arranged to engage a primary anode terminal of said capacitor.

18. The multiple anode capacitor of claim 17 wherein said second anode layer comprises a further terminal strip affixed transversely to said second anode foil, arranged to engage said primary anode terminal of said capacitor.

19. The multiple anode capacitor of claim 18 wherein said second anode terminal strip is offset with respect to said first anode terminal strip.

20. The multiple anode capacitor of claim 19 comprising a third interleaved anode strip wherein said second anode terminal strip is offset with respect to said first anode terminal strip, and said third anode terminal strip is offset with respect to both said first anode terminal strip and said second anode terminal strip.

21. The multiple anode capacitor of claim 12 wherein said separator layers, said cathode layer and said anode layers, are in contact with an electrolyte.

22. The multiple anode capacitor of claim 12 wherein said first anode layer comprises a solid core aluminum foil throughout its length.

23. The multiple anode capacitor of claim 12 wherein said porous aluminum foil comprising a porous anode layer has a minimum porosity, measured by air flow, of about 0.5 cc/sec-cm$^2$-atm, and a foil surface area, measured by capacitance, of at least about 0.2 $\mu$F per square centimeter.

24. The multiple anode capacitor of claim 23 wherein said porous aluminum foil of said porous anode layer is roughened to enable a capacitance of at least about 0.4 $\mu$F per square centimeter and said cathode layer has a capacitance of from about 5 to about 300 $\mu$F per square centimeter.

* * * * *